(12) United States Patent
Mizuno (10) Patent No.: US 11,117,298 B2
(45) Date of Patent: Sep. 14, 2021

(54) EJECTOR MECHANISM OF INJECTION MOLDING MACHINE

(71) Applicant: FANUC CORPORATION, Yamanashi (JP)

(72) Inventor: Takaya Mizuno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/779,907

(22) Filed: Feb. 3, 2020

(65) Prior Publication Data

US 2020/0247026 A1 Aug. 6, 2020

(30) Foreign Application Priority Data

Feb. 6, 2019 (JP) .............................. JP2019-019799

(51) Int. Cl.
*B29C 45/53* (2006.01)
*B29C 45/60* (2006.01)
*F16H 9/12* (2006.01)

(52) U.S. Cl.
CPC ............ *B29C 45/531* (2013.01); *B29C 45/60* (2013.01); *F16H 9/12* (2013.01)

(58) Field of Classification Search
CPC ... B29C 45/531; B29C 45/60; B29C 45/1775; B29C 2045/1797; B29C 45/1701; B29C 2045/4036
See application file for complete search history.

(56) References Cited

U.S. PATENT DOCUMENTS 2,214,854 A * 9/1940 Heyer ....................... F16H 9/14
474/26
4,336,627 A * 6/1982 Bascus ................ A47L 11/4094
15/321

(Continued)

FOREIGN PATENT DOCUMENTS

JP 2000-210994 A 8/2000
JP 2006-021338 A 1/2006

(Continued)

OTHER PUBLICATIONS

An Office Action; "Notice of Reasons for Refusal", mailed by the Japanese Patent Office dated Jun. 15, 2021, which corresponds to Japanese Patent Application No. 2019-019799 and is related to U.S. Appl. No. 16/779,907; with English language translation.

*Primary Examiner* — Xiao S Zhao
*Assistant Examiner* — Emmanuel S Luk
(74) *Attorney, Agent, or Firm* — Studebaker & Brackett PC (57) ABSTRACT

To provide an ejector mechanism of an injection molding machine that improves handling performance of a sound-proof cover while ensuring excellent sound-proof performance. An ejector mechanism of an injection molding machine comprises: a plurality of ball screws that rotates clockwise and counterclockwise about an axis to make an ejector plate and an ejector pin advance and retreat together; a plurality of driven pulleys and each connected to a corresponding one of the ball screws; a driving pulley that rotates clockwise and counterclockwise in response to the driving of a driving motor; an endless transmission belt wound on the driving pulley and the driven pulleys; an idler pulley on which the transmission belt is wound in such a manner as to define a small area of a region surrounded by the endless transmission belt wound on the driving pulley (Continued)

and the driven pulleys; and a sound-proof cover provided to cover the driving pulley, the driven pulleys, the idler pulley, and the transmission belt.

1 Claim, 10 Drawing Sheets

(56) References Cited

U.S. PATENT DOCUMENTS

| | | | | |
|---|---|---|---|---|
| 5,370,524 | A * | 12/1994 | Liang | B29C 45/4005 425/451.6 |
| 6,024,560 | A * | 2/2000 | Ito | B29C 45/07 425/593 |
| 6,113,376 | A * | 9/2000 | Eppich | B29C 45/17 425/190 |
| 6,478,571 | B1 * | 11/2002 | Tsai | B29C 45/4005 425/556 |
| 7,396,215 | B2 * | 7/2008 | Ozawa | F04D 29/106 417/362 |
| 9,138,923 | B2 * | 9/2015 | Kuroda | B29C 45/07 |
| 2005/0181088 | A1 * | 8/2005 | Uchiyama | B29C 45/7626 425/139 |
| 2011/0177187 | A1 * | 7/2011 | Nishimura | B29C 45/768 425/169 |
| 2013/0307190 | A1 * | 11/2013 | Nagatomi | B22D 17/263 264/328.1 |
| 2021/0060841 | A1 * | 3/2021 | Sugahara | B29C 45/768 |

FOREIGN PATENT DOCUMENTS

| | | |
|---|---|---|
| JP | 2006-150597 A | 6/2006 |
| JP | 2009-143028 A | 7/2009 |
| JP | 2010-012623 A | 1/2010 |
| JP | 2012-091220 A | 5/2012 |
| JP | 2012-161995 A | 8/2012 |

* cited by examiner

EJECTOR MECHANISM OF INJECTION MOLDING MACHINE

This application is based on and claims the benefit of priority from Japanese Patent Application No. 2019-019799, filed on 6 Feb. 2019, the content of which is incorporated herein by reference.

BACKGROUND OF THE INVENTION

Field of the Invention

The present invention relates to an ejector mechanism of an injection molding machine.

Related Art

An injection molding method (injection molding machine) has conventionally been used in many cases as it can produce moldings of complicated shapes efficiently in large quantity.

The configuration of an injection molding machine includes: a clamping device that moves a moving platen (moving platform) relative to a stationary platen (stationary platform) for opening, closing, and clamping of molds in a pair including a stationary-side mold and a moving-side mold; and an injection device provided to be movable relative to the stationary platen using a feed mechanism. The injection device injects a molding material such as molten resin into a cavity in the clamped molds in a pair.

The injection molding machine further includes an ejector mechanism (extruding mechanism) for removing a molding attached to the molds after opening of the molds in a pair.

Figure 9:
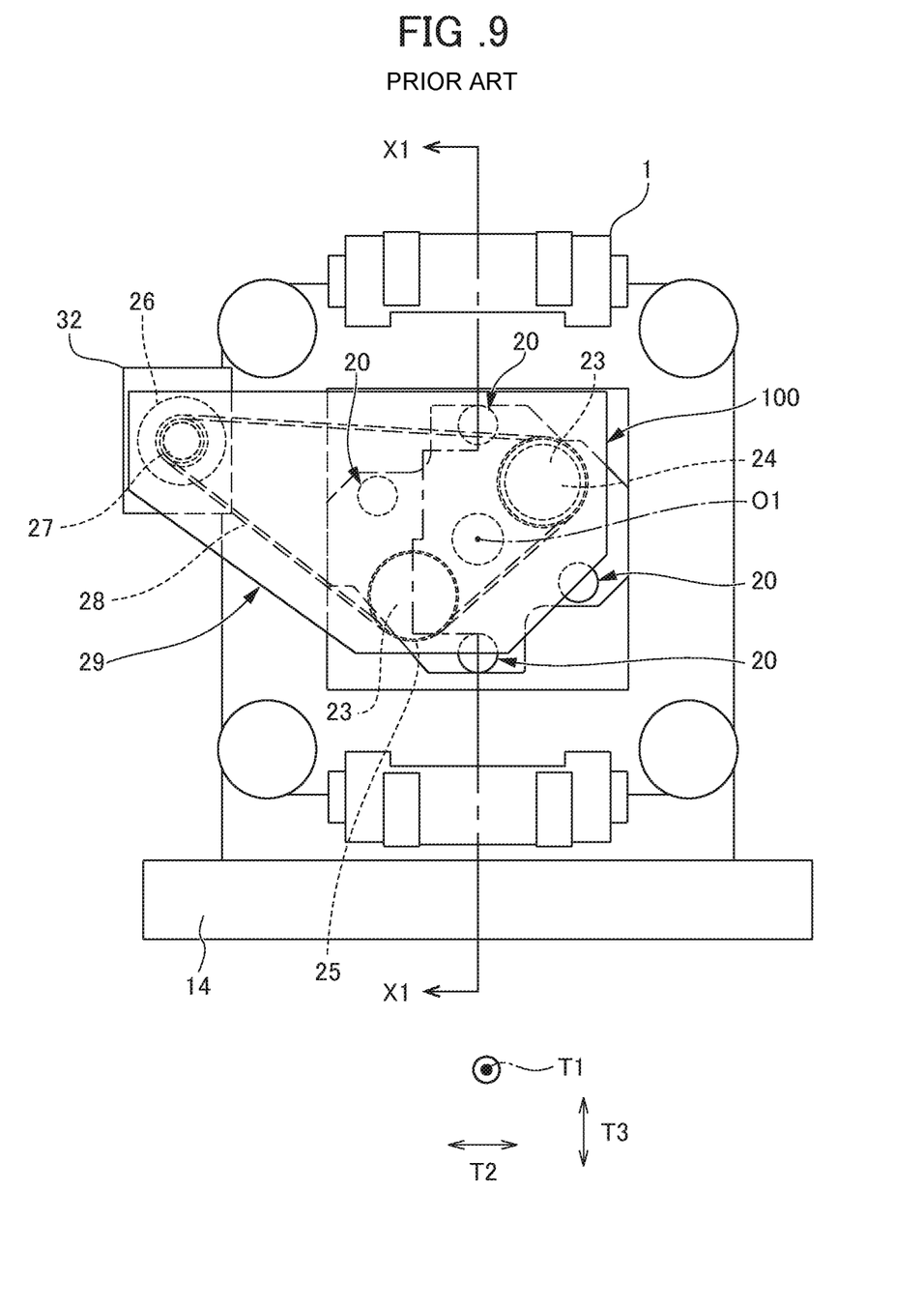
FIG. 9 shows an ejector mechanism of a conventional injection molding machine.
Figure 10:
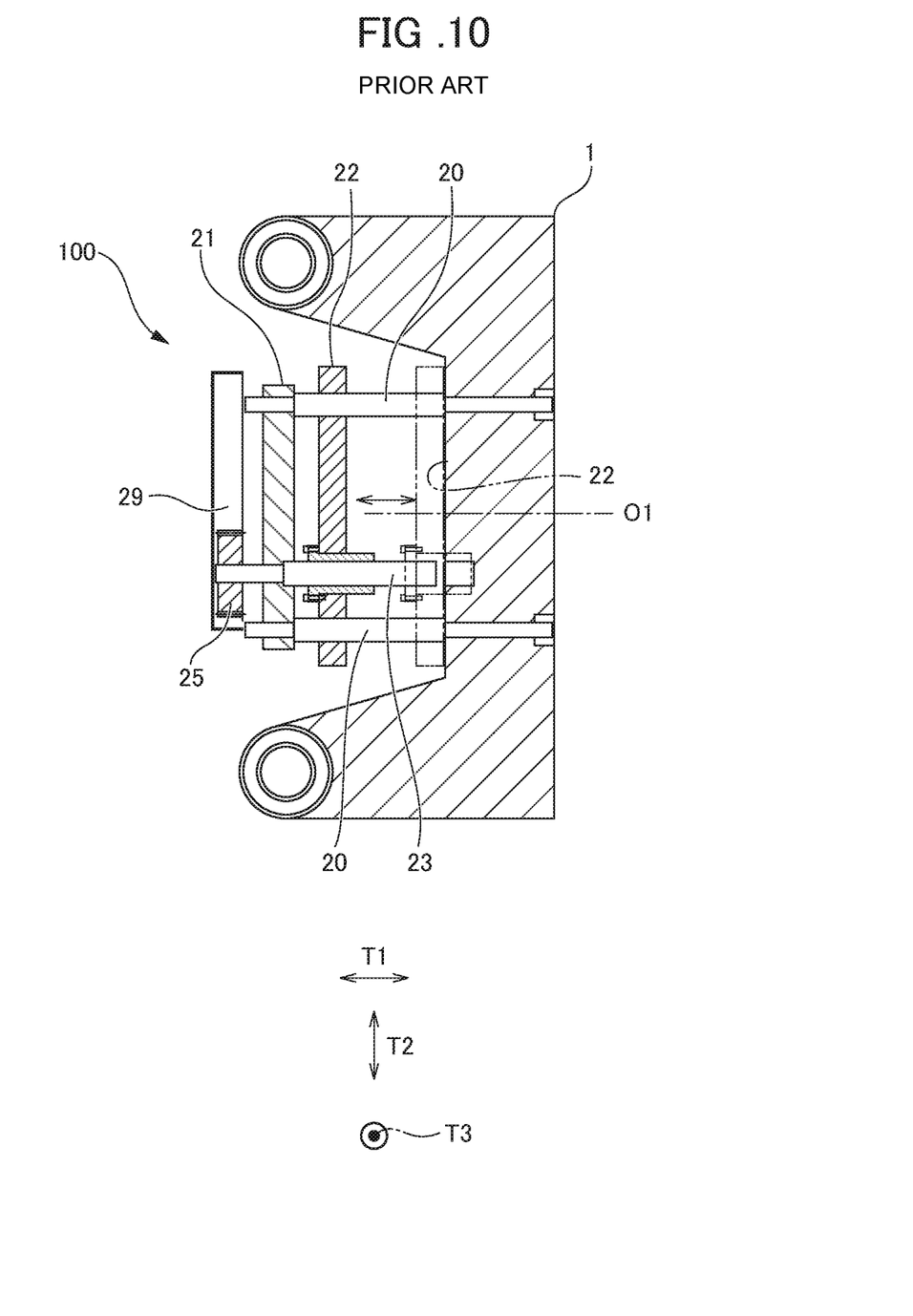
FIG. 10 is a view taken along an arrowed line X1-X1 of FIG. 9 and is a sectional view showing the ejector mechanism of the conventional injection molding machine.

As shown in FIGS. 9 and 10, an ejector mechanism 100 includes: a plurality of guide rods 20 provided at a moving platen 1, each having one end connected to the moving platen 1, and extending in a mold opening and closing direction (clamping direction) conforming to the direction of an axis O1 of an injection molding machine; a guide rod plate 21 attached to the other end of the guide rod 20; an ejector plate 22 provided with an ejector pin for extruding a molding and configured to advance and retreat freely in the mold opening and closing direction under guidance by the guide rods 20; a plurality of ball screws 23 each having one end rotatably supported on the moving platen 1 and the other end rotatably supported on the guide rod plate 21, and rotating clockwise and counterclockwise around the axis to make the ejector plate 22 advance and retreat; a plurality of driven pulleys 24 and 25 each attached to the one end of a corresponding one of the ball screws 23 rotatably supported on the guide rod 20; a driving pulley 27 driven to rotate by the driving of a driving motor 26; and an endless transmission belt 28 wound on the driving pulley 27 and the driven pulleys 24 and 25 in meshing engagement therewith (see patent document 1, patent document 2, patent document 3, and patent document 4, for example).

When the driving motor 26 is driven to drive the driving pulley 27 to rotate clockwise and counterclockwise, the transmission belt 28 rotates clockwise and counterclockwise. Together with this rotation, the driven pulleys 24 and 25, eventually, the ball screws 23 rotate clockwise and counterclockwise. This allows the ejector plate 22 and the ejector pin to advance and retreat in the direction of the axis O1, so that a molding can be extruded and removed from molds (demolded) with the ejector pin in an advanced position.

During the driving of the ejector mechanism 100, noise is caused from contact areas between parts such as the driving pulley 27, the driven pulleys 24 and 25, the transmission belt 28, etc. In response to this, the ejector mechanism 100 is generally provided with a sound-proof cover 29 for covering the parts such as the driving pulley 27, the driven pulleys 24 and 25, the transmission belt 28, etc. and for reducing noise.

Patent Document 1: Japanese Unexamined Patent Application, Publication. No. 2006-021338
Patent Document 2: Japanese Unexamined Patent Application, Publication No. 2006-150597
Patent Document 3: Japanese Unexamined Patent Application, Publication No. 2009-143028
Patent Document 4: Japanese Unexamined Patent Application, Publication No. 2012-091220

SUMMARY OF THE INVENTION

However, providing the sound-proof cover in such a manner as to cover the parts such as the driving pulley, the driven pulleys, the transmission belt, etc. entirely arranged on the opposite side of the moving platen across the guide rod plate unintentionally results in significant size increase of the sound-proof cover. This has caused inconvenience in terms of bad handling performance of the sound-proof cover, even though the sound-proof cover achieves excellent sound-proof performance.

In some cases, a sound-proof cover is installed for each of contact areas between the parts such as the driving pulley, the driven pulleys, the transmission belt, etc. However, this configuration causes exposure of a part such as the transmission belt located in an area other than the contact areas, causing a problem of reduced sound-proof performance.

Hence, a method or means for improving handling performance of the sound-proof cover while ensuring excellent sound-proof performance has strongly been desired.

One aspect of this disclosure comprises: a plurality of ball screws that rotates clockwise and counterclockwise about an axis to make an ejector plate and an ejector pin advance and retreat together; a plurality of driven pulleys each connected to a corresponding one of the ball screws; a driving pulley that rotates clockwise and counterclockwise in response to the driving of a driving motor; an endless transmission belt wound on the driving pulley and the driven pulleys; an idler pulley on which the transmission belt is wound in such a manner as to define a small area of a region surrounded by the endless transmission belt wound on the driving pulley and the driven pulleys; and a sound-proof cover provided to cover the driving pulley, the driven pulleys, the idler pulley, and the transmission belt.

According to the one aspect of this disclosure, the area of the region surrounded by the endless transmission belt can reduced by the provision of the idler pulley. This allows size reduction of the sound-proof cover covering the driving pulley, the driven pulleys, and the idler pulley. By doing so, handling performance of the sound-proof cover can be improved while excellent sound-proof performance is ensured.

DETAILED DESCRIPTION OF THE INVENTION

An ejector mechanism of an injection molding machine according to an embodiment of the present invention will be described below by referring to FIGS. 1 to 8.

Figure 1:
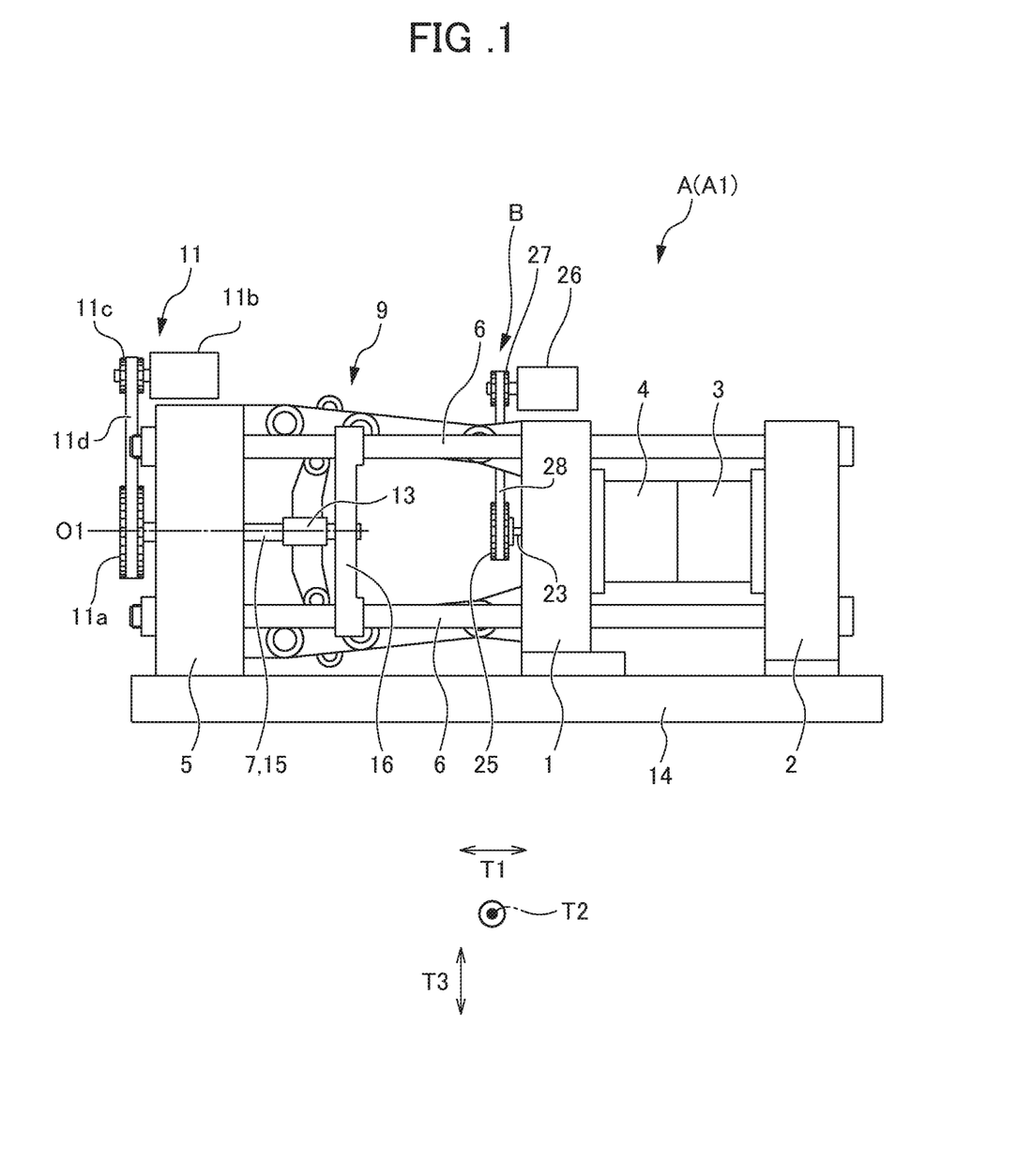
FIG. 1 shows an injection molding machine according to an embodiment.

As shown in FIG. 1, an injection molding machine A of the embodiment includes: a clamping device A1 that moves a moving platen 1 frontward and rearward in a horizontal transverse direction T1 relative to a stationary platen 2 for opening, closing, and clamping of a mold 3 and a mold 4; an injection device (not shown) provided to be movable relative to the stationary platen 2 using a feed mechanism and used for injecting a molding material such as molten resin into a cavity in the clamped molds 3 and 4 in a pair; and an ejector mechanism B for taking a molding out of the molds 3 and 4.

As shown in FIG. 1, the clamping device A1 includes: a rear platen 5 provided on the opposite side of the stationary platen 2 across the moving platen 1; a plurality of tie bars 6 each defining an axis direction pointed in the horizontal transverse direction T1, having one end fixedly connected to the rear platen 5 and the other end fixedly connected to the stationary platen 2, and supporting the moving platen 1 in a manner allowing advance and retreat of the moving platen 1 while penetrating the moving platen 1; a crosshead 13 linked to a ball screw 7 through a ball nut, and advancing and retreating frontward and rearward in response to the rotation of the ball screw 7 about an axis O1; a toggle mechanism 9 for making the moving platen 1 advance and retreat in response to the advance and retreat of the crosshead 13; a guide rod 15; and a guide rod support 16.

The stationary platen 2 and the rear platen 5 are provided fixedly on a base (machine base) 14. The moving platen 1 is supported by the base 14 and the tie bar 6 in such a manner as to be capable of advancing and retreating frontward and rearward in the transverse direction T1.

The toggle mechanism 9 is a mechanism connected to both the rear platen 5 and the moving platen 1 and used for making the moving platen 1 advance and retreat. The toggle mechanism 9 is configured by connecting a toggle link, a toggle pin, and the crosshead 13 in a manner allowing each of the toggle link, the toggle pin, and the crosshead 13 to pivot freely.

In response to the clockwise and counterclockwise rotation of the ball screw 7 about the axis O1, the crosshead 13 linked to the ball nut threadedly engaged with the ball screw 7 moves frontward and rearward. Further, as the toggle link pivots at each connecting point to expand and contract the toggle mechanism 9 frontward and rearward in the transverse direction T1, the toggle mechanism 9 amplifies the force of the crosshead 13 to generate force for making the moving platen 1 advance and retreat, eventually, generate force of clamping the molds 3 and 4 in a pair.

The configuration of a driving device 11 for rotating the ball screw 7 includes: a driven pulley 11a attached to one end of the ball screw 7 supported on the rear platen 5 with a bearing, for example, in such a manner as to be rotatable about the axis O1; a driving motor 11b; a driving pulley 11c attached to the rotary axis of the driving motor 11b; and an endless transmission belt 11d wound on the driven pulley 11a and the driving pulley 11c.

Driving the driving motor 11b makes the transmission belt 11d rotate. In response to this rotation, the driven pulley 11a rotates to rotate the ball screw 7 about the axis O1. Then, the crosshead 13 advances and retreats frontward and rearward in response to the rotation of the ball screw 7 to expand and contract the toggle mechanism 9, thereby allowing the moving platen 1 to advance and retreat frontward and rearward.

Figure 2:
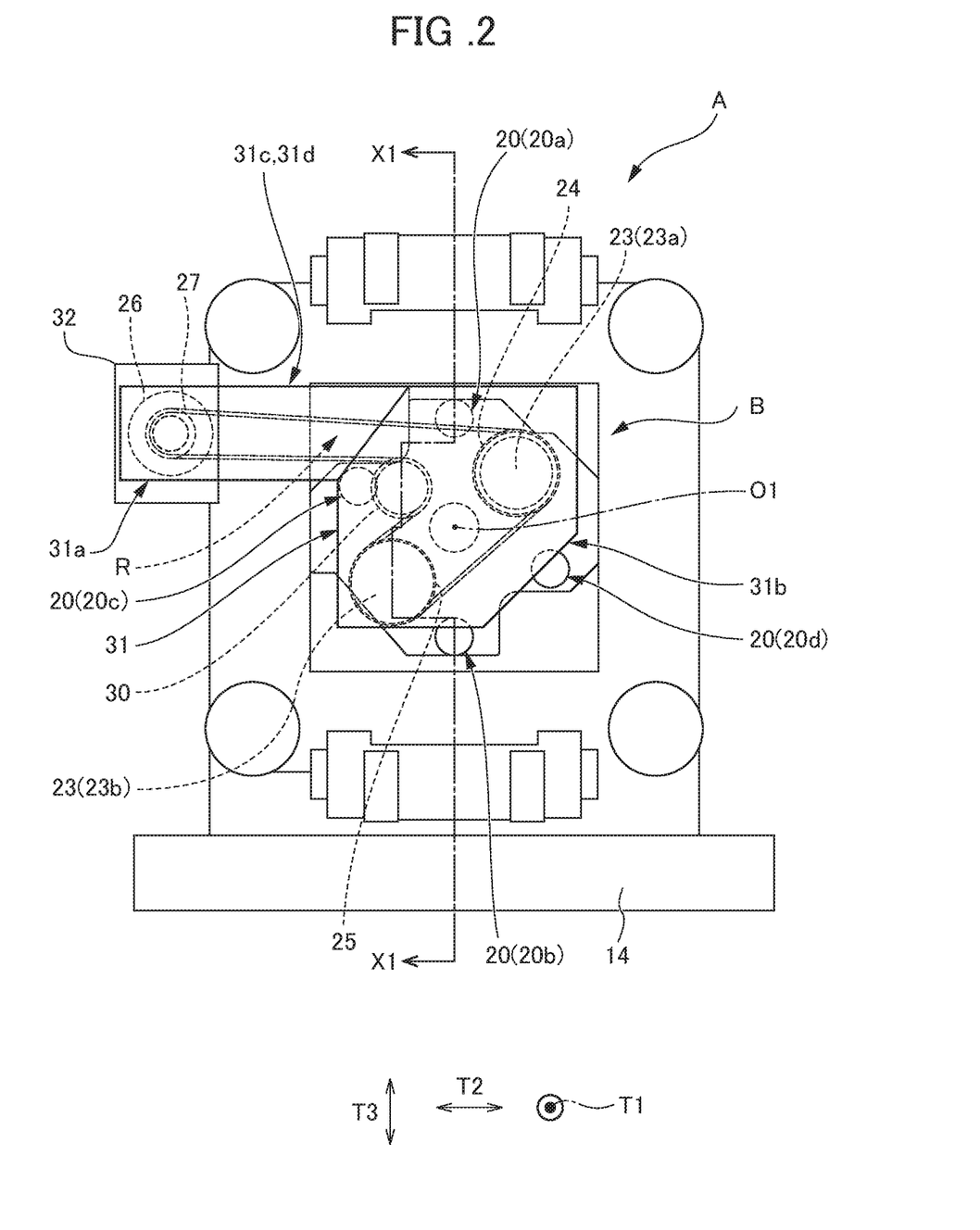
FIG. 2 shows an ejector mechanism of the injection molding machine according to the embodiment.
Figure 3:
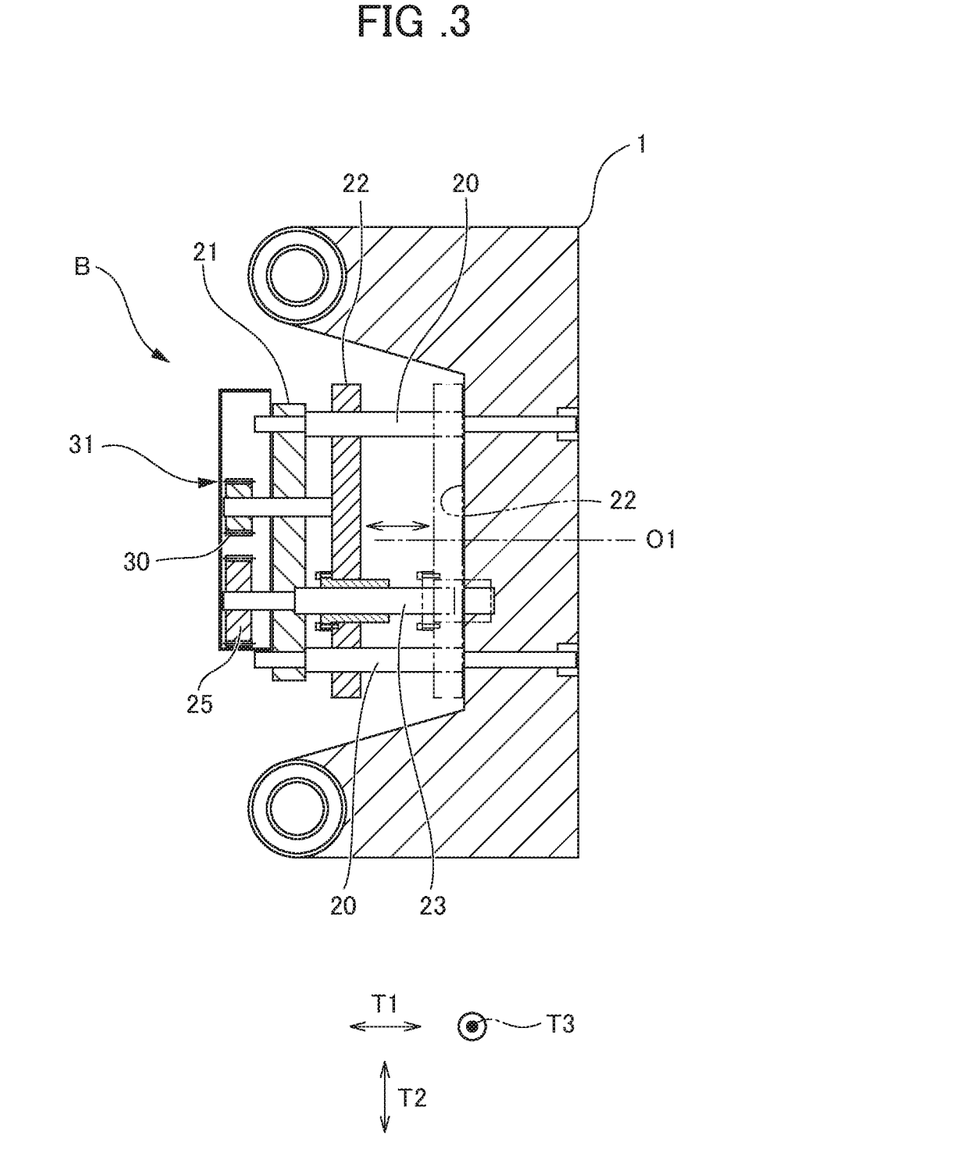
FIG. 3 is a view taken along an arrowed line X1-X1 of FIG. 2 and is a sectional view showing the ejector mechanism of the injection molding machine according to the embodiment.

As shown in FIGS. 2 and 3 (FIG. 1), the configuration of the ejector mechanism B of the injection molding machine of the embodiment includes: four (a plurality of) guide rods 20 for ejector provided at the moving platen 1, each having one end connected to the moving platen 1, and extending in an opening and closing direction of the molds 3 and 4 (clamping direction) conforming to the direction of the axis O1 of the injection molding machine A; a guide rod plate 21 attached to the other end of the guide rod 20; an ejector plate 22 provided with an ejector pin for extruding a molding and configured to advance and retreat freely in the opening and closing direction of the molds 3 and 4 under guidance by the four guide rods 20; two (a plurality of) ball screws 23 each having one end rotatably supported on the moving platen 1 and the other end rotatably supported on the guide rod plate 21, and rotating clockwise and counterclockwise around the axis to make the ejector plate 22 advance and retreat; two (a plurality of) driven pulleys 24 and 25 each attached to the one end of a corresponding one of the two ball screws 23 rotatably supported on the guide rod 20; a driving pulley 27 driven to rotate by the driving of a driving motor 26; and an endless transmission belt 28 wound on the driving pulley 27 and the two driven pulleys 24 and 25 in meshing engagement therewith.

The ejector mechanism B of the injection molding machine A of the embodiment further includes: an idler pulley 30 on which the transmission belt 28 is wound in such a manner as to define a small area of a region R surrounded by the endless transmission belt 28 wound on the driving pulley 27 and the two driven pulleys 24 and 25 (the area of circling motion of the transmission belt 28); and a sound-proof cover 31 provided as to cover the driving pulley 27, the two driven pulleys 24 and 25, the idler pulley 30, and the transmission belt 28.

The two ball screws 23, eventually, the two driven pulleys 24 and 25 and the two guide rods 20 are arranged on the diagonal lines of the ejector plate 22 having a shape like a rectangular flat plate.

More specifically, in the embodiment, the two ball screws 23, eventually, the two driven pulleys 24 and 25 are arranged symmetrically with respect to the axis O1 of the injection molding machine A. One ball screw 23a (23) and the driven pulley 24 are arranged above the axis O1 and closer to one side in a width direction T2 than the axis O1. The other ball screw 23b (23) and the driven pulley 25 are arranged below the axis O1 and closer to the other side in the width direction T2 than the axis O1.

The four guide rods 20 are arranged symmetrically with respect to the axis O1 of the injection molding machine A. A guide rod 20a (20) is arranged directly above the axis O1. A guide rod 20b (20) is arranged directly below the axis O1. A guide rod 20c (20) is arranged above the axis O1 and closer to the other side in the width direction T2 than the axis O1. A guide rod 20d (20) is arranged below the axis O1 and closer to the one side in the width direction T2 than the axis O1.

The idler pulley 30 of the embodiment is arranged in such a manner that the transmission belt 28 between the driving pulley 27 and the lower driven pulley 25 adjacent to the idler pulley 30 is wound on the idler pulley 30. The idler pulley 30 is arranged closer to the axis O1 in the width direction T2 than the lower driven pulley 25, between the upper driven pulley 24 and the lower driven pulley 25 in a vertical direction T3, and between the lower driven pulley 25 and the upper guide rod 20a (20) in the vertical direction T3.

Figure 4:
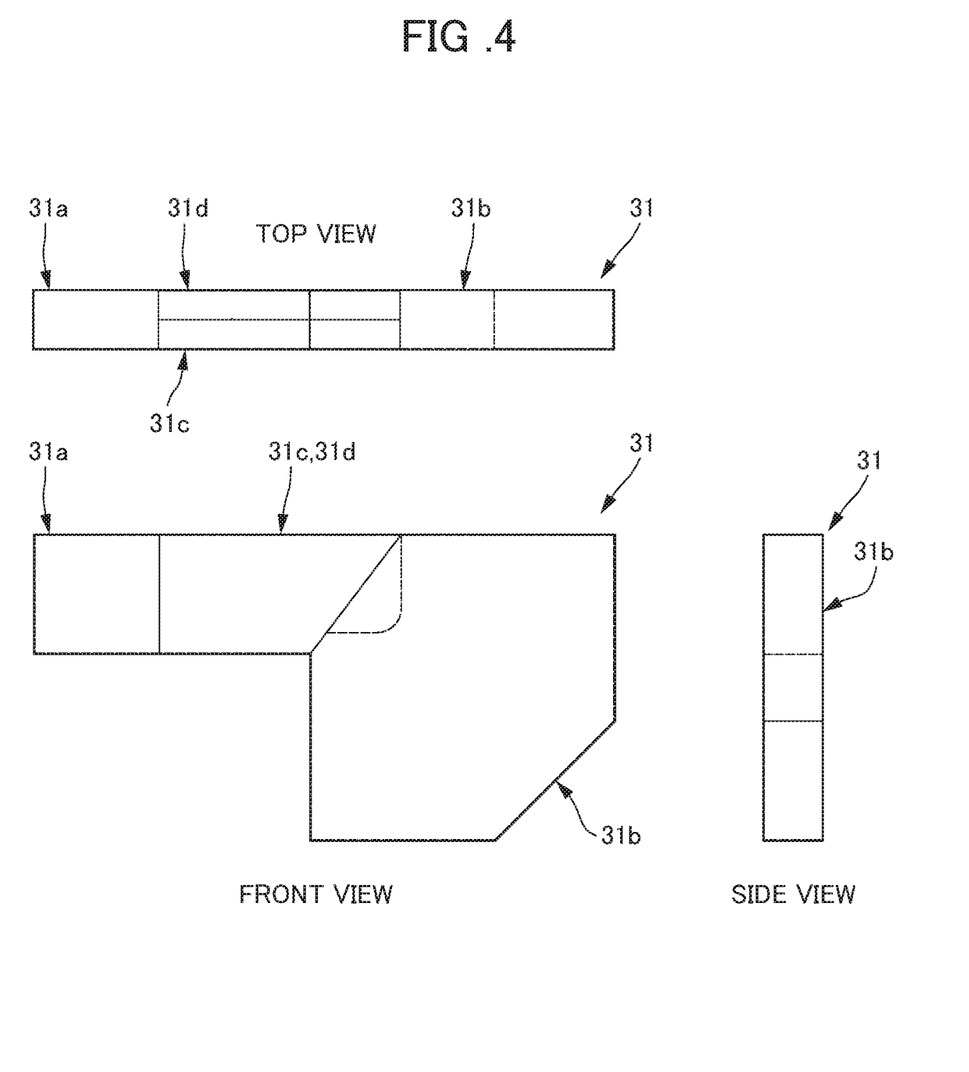
FIG. 4 shows a sound-proof cover of the ejector mechanism of the injection molding machine according to the embodiment.

The sound-proof cover 31 of the embodiment covering the driving pulley 27, the two driven pulleys 24 and 25, the idler pulley 30, and the transmission belt 28 is formed by bending sheet metal, for example. As shown in FIGS. 2 and 4, the sound-proof cover 31 is split into three.

Figure 5:
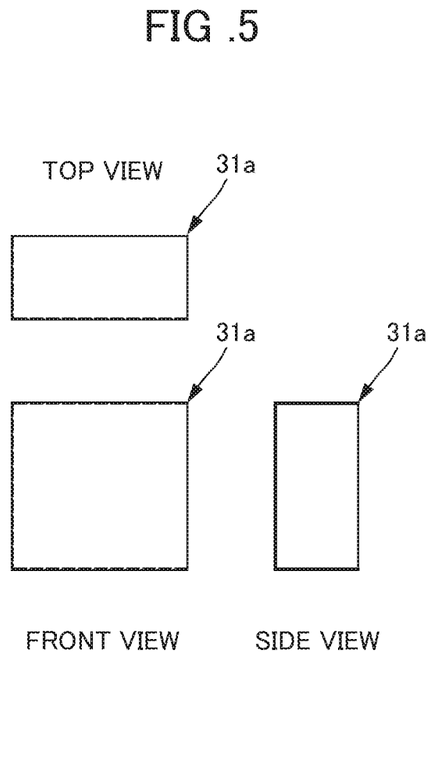
FIG. 5 shows a first split piece of the sound-proof cover of the ejector mechanism of the injection molding machine according to the embodiment.

As shown in FIGS. 2, 4, and 5, a first split piece 31a of the sound-proof cover 31 is formed into a box-like shape with one opened side and has an end portion on the opened side connected to a support plate 32 (see FIG. 2) supporting the driving motor 26. The first split piece 31a is arranged to cover the driving pulley 27 on the opposite side of the moving platen 1 relative to the support plate 32 and a part of the transmission belt 28 wound on the driving pulley 27, and to house the covered parts together with the support plate 32.

Figure 6:
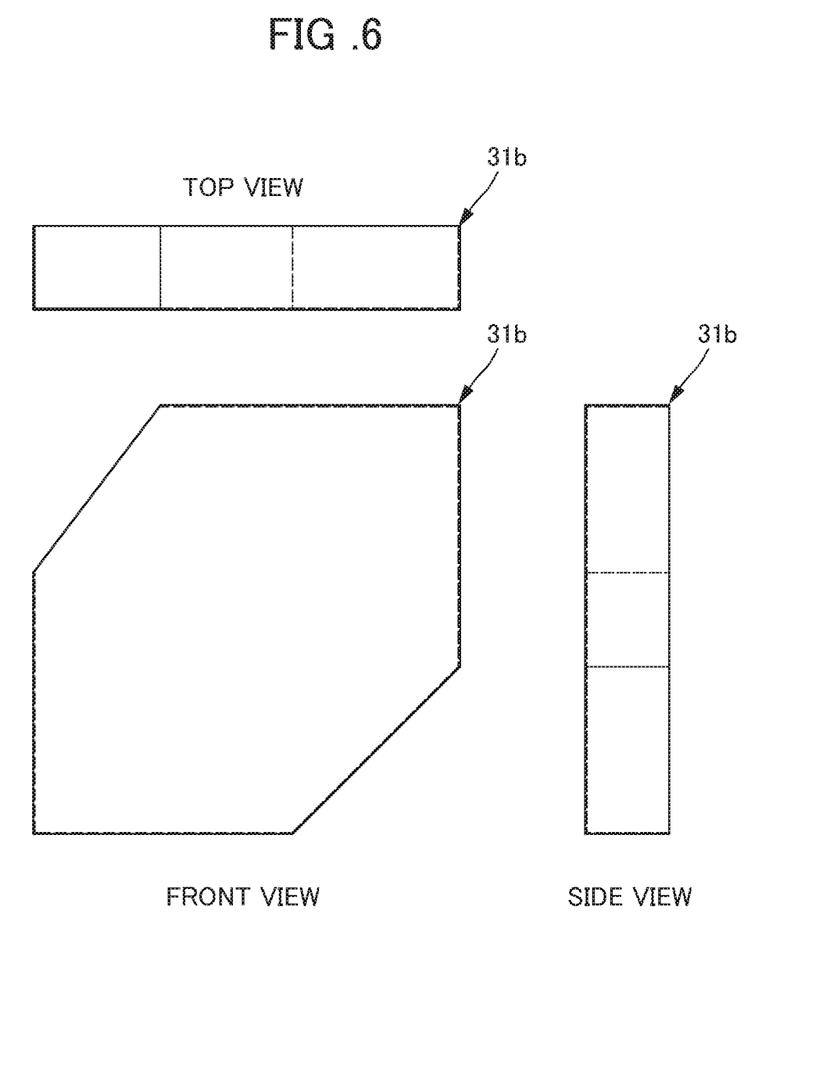
FIG. 6 shows a second split piece of the sound-proof cover of the ejector mechanism of the injection molding machine according to the embodiment.
Figure 7:
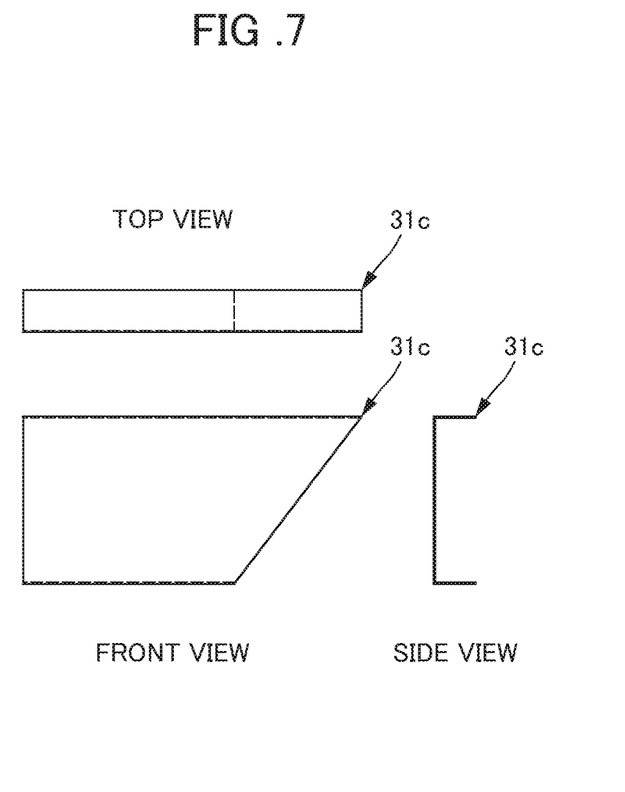
FIG. 7 shows a third split piece of the sound-proof cover of the ejector mechanism of the injection molding machine according to the embodiment.
Figure 8:
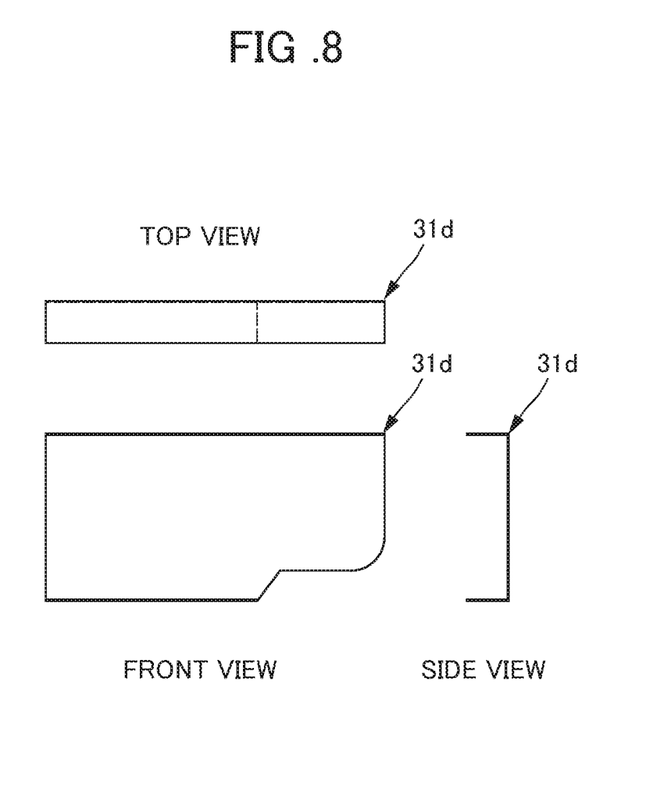
FIG. 8 shows a third split piece of the sound-proof cover of the ejector mechanism of the injection molding machine according to the embodiment.

As shown in FIGS. 2, 4, and 6, a second split piece 31b of the sound-proof cover 31 is formed into a box-like shape with one opened side and has an end portion on the opened side connected to the guide rod plate 21. The second split piece 31b is arranged to cover the two driven pulleys 24 and 25 on the opposite side of the moving platen 1 relative to the guide rod plate 21, the idler pulley 30, and a part of the transmission belt 28 wound on the driven pulleys 24 and 25 and the idler pulley 30, and to house the covered parts together with the guide rod plate 21.

As shown in FIGS. 2, 4, 7, and 8, a third split piece 31c and a third split piece 31d of the sound-proof cover 31 include two members 31c and 31d each having an angular U-shape in cross section, and are formed into a substantially rectangular tubular shape by assembling the two members 31c and 31d. The third split pieces 31c and 31d are arranged to house a part of the transmission belt 28 stretched from the driving pulley 27 to the upper driven pulley 24 and a part of the transmission belt 28 stretched from the driving pulley 27 to the idler pulley 30 therein. Further, the third split pieces 31c and 31d each have one end portion connected to the first split piece 31a and the other end portion connected to the second split piece 31b.

In the ejector mechanism B of the injection molding machine A of the embodiment having the foregoing configuration, the idler pulley 30 is provided and the area of the region R surrounded by the transmission belt 28 wound on the driving pulley 27 and the driven pulleys 24 and 25 is small. This achieves size reduction of the sound-proof cover 31 while the sound-proof cover 31 covers the driving pulley 27, the driven pulleys 24 and 25, the idler pulley 30, and the transmission belt 28.

Providing the idler pulley 30 and holding the transmission belt 28 from the inside of the transmission belt 28 makes it possible to increase meshing engagement of the transmission belt 28 with the driving pulley 27 and the driven pulleys 24 and 25. By doing so, driving force can be transmitted efficiently, precisely, and effectively through the transmission belt 28 to the driven pulleys 24 and 25, eventually, to the ball screws 23.

The idler pulley 30 is arranged in such a manner that the transmission belt 28 between the driving pulley 27 and the driven pulley 25 adjacent to the idler pulley 30 is wound on the idler pulley 30. By doing so, the area of the region R surrounded by the transmission belt 28 can be reduced effectively to encourage size reduction of the sound-proof cover 31 and improvement of performance of transmitting driving force.

Forming the sound-proof cover 31 as a member with a plurality of split pieces facilitates attachment and removal of the sound-proof cover 31. This improves handling performance during change of the transmission belt 28, for example.

As a result, the ejector mechanism B of the in molding machine A of the embodiment allows improvement of handling performance of the sound-proof cover 31 and improvement of performance of transmitting driving force while ensuring excellent sound-proof performance.

While the embodiment of the ejector mechanism of the injection molding machine according to the present invention has been described above, the present invention should not be limited to the foregoing embodiment but can be changed, where appropriate, within a range not deviating from the substance of the invention.

For example, while the injection molding machine according to the present invention has been described as a horizontal injection molding machine, the present invention is further applicable to a vertical (longitudinal) injection molding machine.

EXPLANATION OF REFERENCE NUMERALS

1 Moving platen
2 Stationary platen
3 Stationary-side mold
4 Moving-side mold
5 Rear platen
6 Tie bar
7 Ball screw
9 Toggle mechanism
11 Driving device
13 Crosshead
15 Guide rod
16 Guide rod support
20 Guide rod
21 Guide rod plate
22 Ejector plate
23 Ball screw
24 Driven pulley
25 Driven pulley
26 Driving motor
27 Driving pulley 28 Transmission belt
29 Conventional sound-proof cover
30 Idle pulley
31 Sound-proof cover
A Injection molding machine
A1 Clamping device of injection molding machine
B Ejector mechanism of injection molding machine
O1 Axis of injection molding machine
T1 Transverse direction (front-rear direction)
T2 Transverse direction (width direction))
T3 Vertical direction

What is claimed is:

1. An ejector mechanism of an injection molding machine comprising: a plurality of ball screws that rotates clockwise and counterclockwise about an axis to make an ejector plate and an ejector pin advance and retreat together along a central axis of the ejector plate;
   a plurality of driven pulleys each connected to a corresponding one of the ball screws;
   a driving pulley that rotates clockwise and counterclockwise in response to the driving of a driving motor;
   an endless transmission belt wound on the driving pulley and the driven pulleys;
   an idler pulley on which the transmission belt is wound in such a manner as to define a small area of a region surrounded by the endless transmission belt wound on the driving pulley and the driven pulleys; and
   a sound-proof cover provided to cover the driving pulley, the driven pulleys, the idler pulley, and the transmission belt;
   wherein the idler pulley is arranged in such a manner that the transmission belt between the driving pulley and one of the driven pulleys adjacent to the idler pulley is wound on the idler pulley;
   wherein the idler pulley is located closer to the central axis in a first direction orthogonal to the central axis than the one of the driven pulleys adjacent to the idler pulley;
   wherein the idler pulley is between the one of the driven pulleys adjacent to the idler pulley and another one of the driven pulleys in a second direction orthogonal to the first direction; and
   wherein the idler pulley is between a guide rod parallel to the central axis supporting the ejector plate to advance and retreat, and the one of the driven pulleys adjacent to the idler pulley in the second direction.

* * * * *